Figure 1:
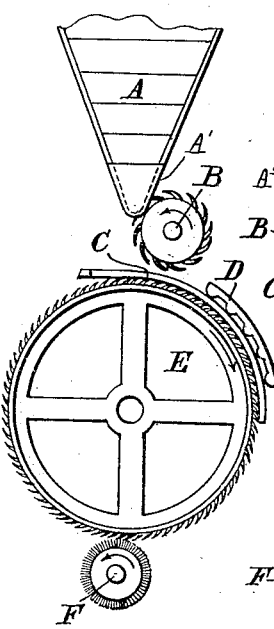

C. TUCKFIELD.
COTTON GIN.
APPLICATION FILED FEB. 3, 1908.

912,210.

Patented Feb. 9, 1909.

Witnesses:
J. K. Moore
W. F. Doyle

Inventor:
Charles Tuckfield
By Whitaker Prevost
Attys.

UNITED STATES PATENT OFFICE.

CHARLES TUCKFIELD, OF EAST MOLESEY, ENGLAND.

COTTON-GIN.

No. 912,210.  Specification of Letters Patent.  Patented Feb. 9, 1909.

Application filed February 3, 1908. Serial No. 414,072.

*To all whom it may concern:*

Be it known that I, CHARLES TUCKFIELD, a subject of the King of Great Britain, residing at 4 Thames View, East Molesey, Surrey, England, have invented a new and useful Improved Cotton-Gin, of which the following is a specification.

Cotton is usually deseeded by being fed between a roller and a knife or bar, or two rollers spaced to let the cotton but not the seed pass, or else by a saw-gin which consists of a number of circular saws revolving at a high speed with their teeth projecting through bars spaced to keep the seed from being dragged through. In the former cases it will be seen that only a very small portion of the periphery can be utilized and that only intermittently, and in the latter only a line of points while both are liable to crush or tear open small seeds thus staining the cotton. There have also been various modifications invented, such as blowing the fibrous part through a straight grating on to the surface of rollers, but the roller only presents a small line of contact; there have also been modifications of the saw gin proposed in which either saws or spikes project through a grating curved to the roller path; but these also are impracticable because if the teeth or spikes are light they would be crushed by coming in contact with the seed and if made stronger they would tear the seed and so damage the cotton.

The object of my invention is to construct a cotton gin in such a manner that as much as half the surface of the roller can be utilized (although I prefer in practice to use a quarter of the surface) and in which it is impossible for either the cotton or the roller to be damaged. To this end I construct a cotton-gin having a ginning roller, mounted in bearings and having the surface thereof covered with a series of pins or spikes in the manner of an ordinary carding-roller, or otherwise adapted to entangle fibrous matter and above the said ginning roller and fitting closely over a portion of the same I provide a curved grating having a corrugated cover of a preferably flexible material such as india-rubber covering a portion thereof. The bars of the said grating are preferably of an inverted V section and so spaced as to allow cotton seeds to project between them, but not to pass through. A hopper is placed above the covered portion of the grating, the lower portion thereof being formed of bars spaced so that single seeds can be dragged through by a spiked roller, which continuously feeds them between the spaced bars of the grating.

To enable my invention to be fully understood I will describe it by reference to the accompanying drawing, in which:—

Figure 2:
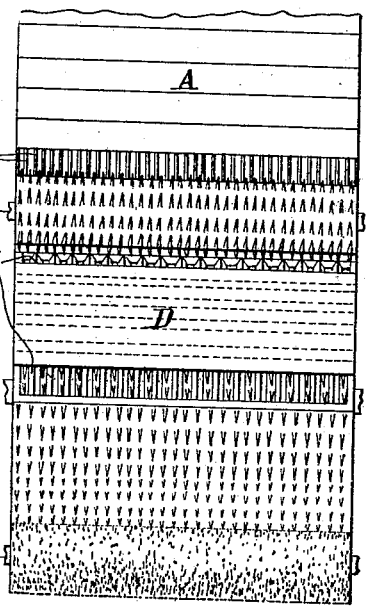
Figure 3:

Figure 1 is a side view of a cotton-gin constructed according to my invention, and Fig. 2 is a front elevation of the same. Fig. 3 is a view of a detail.

A is the hopper, B is the spiked feed-roller, C is the curved grating, D is the flexible cover, E is the ginning roller and F is a small brush for removing the cotton.

The cotton seeds are fed into the hopper A and are dragged singly through the spaced retaining bars A' of the lower portion thereof by the spiked roller B and delivered on to the top of the grating C down which they are pulled by the roller E, the ribbed cover D detaining the seed portion and causing it to roll over and over so that in a short space of time all the cotton is torn out, and is removed by the brush F.

Since considerable force is usually required to remove cotton from the seed, I prefer to form the grating, of bars of inverted V or half round section as shown in Fig. 3, since bars of these sections while allowing the seed to project between them can be made of sufficient strength to enable the cotton to be pulled off without distorting the grating and also a greater number of spaces are obtained than would be the case if bars of a thin wide section containing sufficient metal to resist the pull were used, but I do not confine myself to any particular section of bar.

Having now particularly described and ascertained the nature of my said invention and in what manner the same is to be performed I declare that what I claim is:—

1. In a cotton gin, the combination with the ginning roller, of a curved grating substantially concentric therewith, and formed of bars, constructed to permit contact between the roller and the seeds without permitting the seeds to pass through between said bars, and a curved cover lying over portions of said grating, and substantially concentric therewith, said cover being provided with portions extending into the path of the seeds, to check the progress thereof and hold them in operative relation with the roller, substantially as described.

2. In a cotton gin, the combination with the ginning roller, of a curved grating substantially concentric therewith, formed of bars constructed to permit the seeds to project between without passing through the same, and a cover lying over portions of the grating, provided with portions out of the path of the seeds, and interrupting portions extending into the path of the seeds to arrest them and cause them to be rotated by the ginning roller, substantially as described.

3. In a cotton gin, the combination with the ginning roller, of a curved grating, substantially concentric therewith, and formed of bars constructed to permit the seeds to project between without passing through the same, and a cover extending over portions of the grating, and having transversely disposed flexible portions extending into the path of the seeds, to interrupt the same and cause them to be rotated by the ginning roller, substantially as described.

4. In a cotton gin, the combination with the ginning roller, of a curved grating comprising parallel bars disposed parallel to and exterior to the face of the roller, said bars being spaced to permit the seeds to project between them into contact with the roller without passing between the same, a curved cover of flexible material disposed over a portion of the grating, and provided with transverse ribs, projecting toward the grating to arrest the seeds and cause them to be rotated by the ginning roller, substantially as described.

CHARLES TUCKFIELD.

Witnesses:
 JOHN E. BOUSFIELD,
 C. G. REDFERN.